(12) United States Patent
Mar

(10) Patent No.: US 8,699,985 B1
(45) Date of Patent: Apr. 15, 2014

(54) FREQUENCY GENERATOR INCLUDING DIRECT DIGITAL SYNTHESIZER AND SIGNAL PROCESSOR INCLUDING THE SAME

(75) Inventor: Wing J. Mar, Rohnert Park, CA (US)

(73) Assignee: Agilent Technologies, Inc., Santa Clara, CA (US)

(*) Notice: Subject to any disclaimer, the term of this patent is extended or adjusted under 35 U.S.C. 154(b) by 821 days.

(21) Appl. No.: 12/770,622

(22) Filed: Apr. 29, 2010

(51) Int. Cl.
*H04B 1/26* (2006.01)
*H04B 15/00* (2006.01)

(52) U.S. Cl.
USPC ........... 455/316; 455/319; 455/260; 455/209; 455/76

(58) Field of Classification Search
USPC ........... 455/208, 209, 76, 255–265, 314–333; 331/2, 10–13, 18–22, 31, 46–56, 60, 331/61
See application file for complete search history.

(56) References Cited

U.S. PATENT DOCUMENTS

| | | | |
|---|---|---|---|
| 4,817,197 A * | 3/1989 | Shimizu et al. | 455/208 |
| 5,146,186 A * | 9/1992 | Vella | 331/16 |
| 5,752,175 A * | 5/1998 | Roullet et al. | 455/183.1 |
| 5,924,021 A * | 7/1999 | Paul et al. | 455/209 |
| 6,154,640 A * | 11/2000 | Itoh et al. | 455/76 |
| 6,373,344 B1 * | 4/2002 | Mar | 331/96 |
| 6,522,177 B1 * | 2/2003 | Spampinato | 327/107 |
| 7,013,121 B1 * | 3/2006 | Koh | 455/314 |
| 7,227,346 B1 | 6/2007 | Solbrig | |
| 7,250,823 B2 * | 7/2007 | Shields | 331/16 |
| 7,302,237 B2 * | 11/2007 | Jackson et al. | 455/76 |
| 7,548,742 B2 * | 6/2009 | Johnson | 455/313 |
| 7,599,676 B2 * | 10/2009 | Maxim | 455/258 |
| 7,805,123 B2 * | 9/2010 | Sugiyama et al. | 455/260 |
| 7,885,683 B2 * | 2/2011 | Rofougaran et al. | 455/552.1 |
| 2002/0094053 A1 * | 7/2002 | Blazo | 375/376 |
| 2002/0140512 A1 * | 10/2002 | Stockton | 331/11 |
| 2004/0253935 A1 * | 12/2004 | Drentea | 455/314 |
| 2005/0003785 A1 * | 1/2005 | Jackson et al. | 455/260 |
| 2005/0266818 A1 * | 12/2005 | Johnson et al. | 455/260 |
| 2006/0268182 A1 | 11/2006 | Shields | |
| 2007/0040615 A1 * | 2/2007 | Ammar | 331/2 |
| 2009/0156150 A1 * | 6/2009 | Deleon | 455/260 |
| 2009/0179630 A1 | 7/2009 | Wright et al. | |
| 2009/0295490 A1 * | 12/2009 | Nakamuta et al. | 331/18 |
| 2010/0315138 A1 * | 12/2010 | Namba et al. | 327/157 |
| 2011/0080528 A1 * | 4/2011 | Deleon | 348/731 |
| 2012/0112806 A1 * | 5/2012 | Dayi | 327/145 |

OTHER PUBLICATIONS

A. Chenakin, "Frequency Synthises: Current Solutions and New Trends", Microwave Journal, May 2007, 5 pages.

\* cited by examiner

*Primary Examiner* — Edward Urban
*Assistant Examiner* — Rui Hu

(57) ABSTRACT

A signal processor includes a frequency generator that employs a direct digital synthesizer (DDS) to generate a first local oscillator (LO) signal with a variable first LO frequency. The signal processor also includes an oscillator generating a second LO signal having a second LO frequency. The DDS employs programmable frequency control word and a sampling clock signal having a variable sampling clock frequency that is derived from the second LO frequency, to generate a DDS output signal from which the first LO signal is produced. The variable sampling clock frequency and the programmable frequency control word are selected to avoid crossing spurs in the frequency spectrum of the DDS output signal.

15 Claims, 3 Drawing Sheets

FREQUENCY GENERATOR INCLUDING DIRECT DIGITAL SYNTHESIZER AND SIGNAL PROCESSOR INCLUDING THE SAME

BACKGROUND

A frequency generator or synthesizer, and in particular a programmable or variable frequency generator, is an important component of many electronic systems including for example, spectrum analyzers.

A frequency generator capable of producing an output signal that can be varied across a wide range of frequencies while also maintaining a desired spurious performance would be desirable. A signal processor, analyzer, or receiver that includes a frequency generator capable such performance would also be desirable. A signal processor, analyzer, or receiver that can provide cumulatively low noise performance when the effects of all of the frequency generators or oscillators in the system are considered would further be desirable.

SUMMARY

In an example embodiment, a device comprises: a direct digital synthesizer (DDS) configured to receive a sampling clock signal having a variable sampling clock frequency and further configured to receive a programmable value, and in response thereto to output a DDS output signal having a DDS output frequency that is a function of the sampling clock frequency and the programmable value such that the DDS output frequency can be varied over a frequency range from a lower output frequency to a higher output frequency; and a controller configured to select the programmable value and the sampling clock frequency in combination such that crossing spurs are avoided in a frequency spectrum of the DDS output signal as the DDS output frequency is varied over the frequency range.

In another example embodiment, a device comprises: an input port configured to receive an input signal; a programmable first frequency generator including a direct digital synthesizer (DDS) configured to receive a sampling clock signal having a variable sampling clock frequency and in response thereto to generate a first local oscillator (LO) signal having a variable first LO frequency; a first intermediate frequency (IF) mixer configured to mix the input signal and the first LO signal to produce a first IF signal; a second local oscillator configured to generate a second LO signal having a second LO frequency; and a second intermediate frequency mixer configured to mix the first IF signal and the second LO signal to produce a second IF signal, wherein the sampling clock signal is synchronously derived from the second LO signal.

In yet another example embodiment, a device comprises: an input port configured to receive an input signal; a programmable first frequency generator configured to generate a first local oscillator (LO) signal having a variable first LO frequency; a first intermediate frequency (IF) mixer configured to mix the input signal and the first LO signal to produce a first IF signal; a second local oscillator configured to generate a second LO signal having a second LO frequency; and a second intermediate frequency mixer configured to mix the first IF signal and the second LO signal to produce a second IF signal. The programmable first frequency generator comprises: a first programmable frequency divider configured to receive the second LO signal and to divide the second LO frequency by a first programmable frequency divider value to produce a first reference signal having a first reference frequency, a second programmable frequency divider configured to receive the second LO signal and to divide the second LO frequency by a second programmable frequency divider value to produce a second reference signal having a second reference frequency, a reference frequency mixer configured to mix the first and second reference signals, and to output a sampling clock signal having a sampling clock frequency, a direct digital synthesizer (DDS) configured to receive the sampling clock signal and a programmable frequency control word, and in response thereto to output a DDS output signal having a DDS output frequency that is a function of the sampling clock frequency and the programmable frequency control word, and a signal processor adapted to receive the DDS output signal and to multiply the DDS output frequency to generate the first LO signal.

BRIEF DESCRIPTION OF THE DRAWINGS

The example embodiments are best understood from the following detailed description when read with the accompanying drawing figures. In fact, the dimensions may be arbitrarily increased or decreased for clarity of discussion. Wherever applicable and practical, like reference numerals refer to like elements.

DETAILED DESCRIPTION

In the following detailed description, for purposes of explanation and not limitation, example embodiments disclosing specific details are set forth in order to provide a thorough understanding of an embodiment according to the present teachings. However, it will be apparent to one having ordinary skill in the art having had the benefit of the present disclosure that other embodiments according to the present teachings that depart from the specific details disclosed herein remain within the scope of the appended claims. Moreover, descriptions of well-known apparati and methods may be omitted so as to not obscure the description of the example embodiments. Such methods and apparati are clearly within the scope of the present teachings.

Unless otherwise noted, when a first device is said to be connected to a second device, this encompasses cases where one or more intermediate devices may be employed to connect the two devices to each other. However, when a first device is said to be directly connected to a second device, this encompasses only cases where the two devices are connected to each other without any intermediate or intervening devices. Similarly, when a signal is said to be coupled to a device, this encompasses cases where one or more intermediate devices may be employed to couple the signal to the device. However, when a signal is said to be directly coupled to a device, this encompasses only cases where the signal is directly coupled to the device without any intermediate or intervening devices.

One type of programmable or variable frequency generator is a direct digital synthesizer (DDS). A DDS synthesizes arbitrary signals by outputting amplitude samples of a waveform directly to a digital-to-analog converter (DAC) at a sample rate set by a sampling clock that drives the DDS. A DDS may produce a sinusoidal waveform by having the amplitude samples be samples of a sinusoidal waveform, and by repeatedly outputting one period or cycle of the samples.

The frequency of the output sinusoidal waveform may be changed or programmed by changing the number of sampling clock periods that are required to complete one period or cycle of the output sinusoidal waveform. Accordingly, a DDS is often used as a programmable or variable frequency generator.

Figure 1:
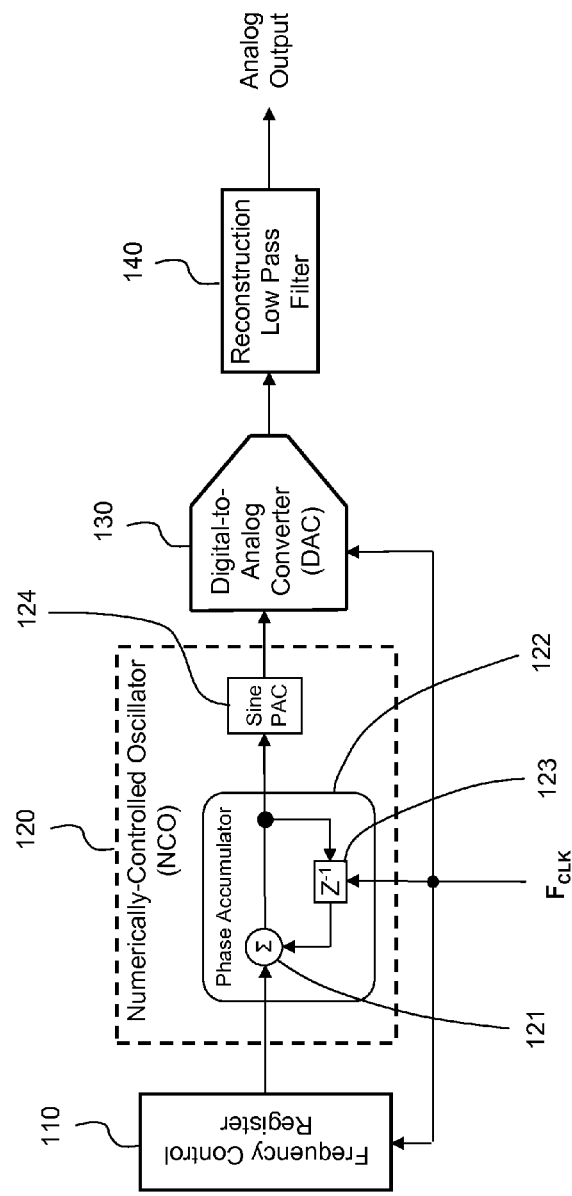
FIG. 1 illustrates one example of a direct digital synthesizer (DDS).

FIG. 1 shows a block diagram of one example of a direct digital synthesizer (DDS) 100. DDS 100 includes a frequency control register 110, a numerically-controlled oscillator (NCO) 120, a digital-to-analog converter (DAC) 130, and a reconstruction low pass filter 140. NCO 120 includes a phase accumulator 122 and a sine wave phase-to-amplitude converter (PAC) 124.

Frequency control register 110, numerically-controlled oscillator (NCO) 120, and digital-to-analog converter (DAC) 130 are clocked by a sampling clock signal having a sampling clock frequency $F_{CLK}$. Typically, the sampling clock signal is provided by a stable frequency source such as a crystal oscillator or surface acoustic wave (SAW) oscillator. In response to the sampling clock signal at the sampling clock frequency $F_{CLK}$, NCO 120 produces at its output a discrete-time, quantized version of the desired output waveform (e.g., a sinusoid having a period controlled by a digital word stored in frequency control register 110). DAC 130 converts the output of NCO 120 to an analog waveform. Reconstruction filter 140 rejects the spectral replicas produced by the zero-order hold inherent in the digital-to-analog conversion process of DAC 130.

In greater detail, phase accumulator 122 consists of an S-bit binary adder 121 and a register 123 configured in a feedback path as shown in FIG. 1. At each clock edge, phase accumulator 122 adds to a value held at its output a value N from frequency control register 110, where N is constant for a given DDS output frequency $F_O$. The resulting output waveform of phase accumulator 122 is a staircase with step size N.

S-bit binary adder 121 is designed to overflow when the sum of the absolute value of its operands exceeds its capacity ($2^S - 1$). The overflow bit is discarded so the output word width is equal to its input word width. The remainder ϕn, called the residual, is stored in register 123 and the cycle repeats, starting this time from ϕn. Since phase accumulator 122 is a finite state machine, eventually the residual at some interval W must return to the initial value ϕ0. The interval W is referred to as the grand repetition rate (GRR) and is given by:

$$GRR = \frac{2^S}{GCD(N, 2^S)}, \quad (1)$$

where GCD is the greatest common divisor function. The GRR represents the true periodicity for a given step size N, which can be very long when NCO 120 has a high resolution.

The output frequency of DDS 100, $F_O$, can be determined by the average overflow rate of phase accumulator 122, given by:

$$F_O = \frac{N}{2^S} F_{CLK}. \quad (2)$$

Accordingly, phase accumulator 122 can be thought of as a programmable non-integer frequency divider having a divide ratio $N/2^S$.

The frequency resolution of DDS 100, $F_{RES}$, defined as the smallest possible incremental change in frequency, is given by:

$$F_{RES} = \frac{F_{CLK}}{2^S}. \quad (3)$$

From equation (3) it can be seen that an arbitrarily fine step size can be achieved by increasing the bit size of phase accumulator 122.

When clocked, phase accumulator 122 creates a modulo-$2^S$ staircase waveform with step size N. In some configurations, the phase output of phase accumulator 122 may be taken from the output of register 123, which introduces a one-clock-cycle latency but allows S-bit binary adder 121 to operate at a higher clock rate. The output waveform from phase accumulator 122 is provided to PAC 124.

PAC 124 can be a simple read only memory (ROM) containing $2^S$ contiguous samples of the desired output waveform (e.g., a sine waveform). Alternately, PAC 124 can be a random access memory (RAM), which can be programmed with values as desired to create an arbitrary waveform generator.

The value S sets the frequency resolution of NCO 120 and is normally much larger than the number of bits, Q, defining the memory space of the look-up table of PAC 124. If the capacity of PAC 124 is $2^Q$ (where Q<S), then the output word from phase accumulator 122 must be truncated to Q bits. The truncation of the phase accumulator output word of phase accumulator 122 does not affect the frequency accuracy of NCO 120, but produces a time-varying periodic phase error, which is a source of spurious products sometimes referred to as "phase truncation spurs." In some embodiments, these phase truncation spurs can be reduced substantially by the introduction of white Gaussian noise (sometimes referred to as "dither noise") prior to truncation. This dither noise is summed into the lower bits of the output word of phase accumulator 122 to linearize the truncation operation. Often the improvement can be achieved without penalty because the noise floor of DAC 130 tends to dominate system performance. In other embodiments, truncation phase error is mitigated by using correction techniques such as power series approximation or trigonometric expansion that are known in the art.

PAC 124 converts the truncated phase output word received from phase accumulator 122 into a digital word representing a quantized sampled sine wave. In particular, PAC 124 uses the truncated phase accumulator output word as an index into a waveform look-up table to output a digital word representing a corresponding amplitude sample of the sine wave. DAC 130 converts each digital word output by PAC 124 in each sample clock period into an analog voltage value, thereby producing an analog waveform, and reconstruction low pass filter 140 filters the analog waveform.

The maximum possible value of the output frequency $F_O$ of DDS 100 is $F_{CLK}/2$. In practice, the actual maximum usable frequency of $F_O$ is about 40% of $F_{CLK}$ due to the need for alias filtering by reconstruction low pass filter 140.

DDS 100 has many advantages for use as a programmable or variable frequency generator over the traditional analog solution, the phase-locked loop (PLL), including much faster frequency tuning speeds and precise control of the output phase across frequency switching transitions. Disadvantages include a higher noise floor at large frequency offsets, due mainly to DAC 130, and spurious levels—including so-called crossing spurs.

The mechanism that produces these crossing spurs will now be described. In particular, when the output frequency of DDS 100, $F_O$, is close to an integer sub-multiple of the sampling clock frequency $F_{CLK}$, a low-frequency beat note is produced to cause spurs to be generated in the spectrum of the output signal of DDS 100. The spur frequency, $F_{SPUR}$, is the difference in the harmonic H of the output frequency $F_O$ and the harmonic P of the sampling clock frequency $F_{CLK}$, i.e., $F_{SPUR}=H*F_O \pm P*F_{CLK}$. A crossing spur occurs when the spur frequency $F_{SPUR}$ moves across zero. Crossing spurs cannot be filtered out, and typically the output frequency $F_O$ has to be carefully placed to avoid them. This can become problematic when DDS 100 is a programmable frequency generator that needs to produce an output signal that can be varied across a wide range of frequencies, for example spanning many octaves or even orders of magnitude.

It is therefore desirable to provide a programmable or variable frequency generator with a DDS than can control the placement of spurs in the frequency spectrum of the DDS output signal so as to reduce or eliminate crossing spurs and their effects.

Figure 2:
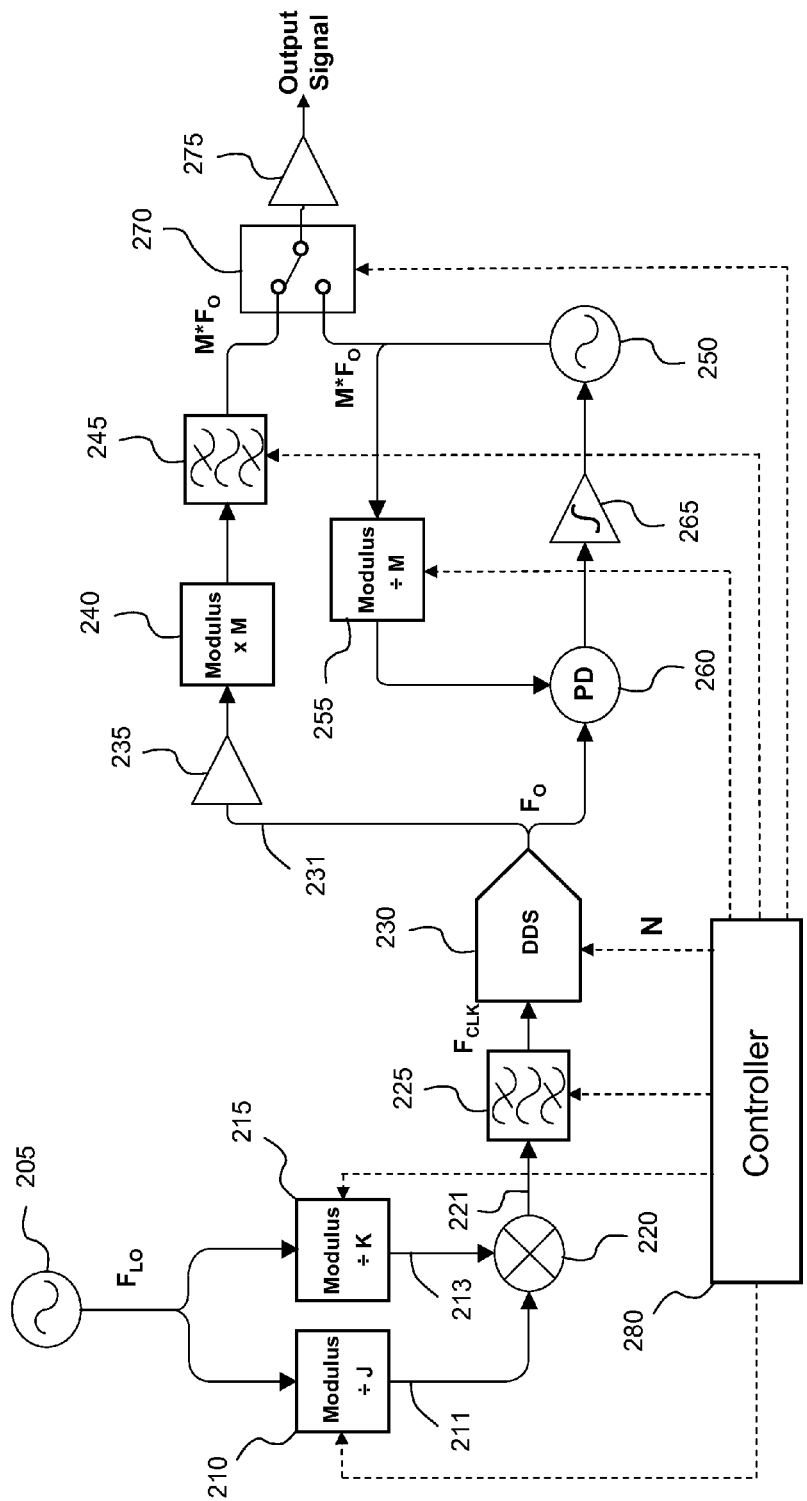
FIG. 2 illustrates one embodiment of a programmable of variable frequency generator.

FIG. 2 illustrates one embodiment of a programmable or variable frequency generator 200. Frequency generator 200 includes an oscillator 205; a first programmable frequency divider 210; a second programmable frequency divider 215; a mixer 220; a filter arrangement 225; a direct digital synthesizer (DDS) 230; an amplifier or buffer 235; a frequency multiplier 240; a filter arrangement 245; a tunable oscillator 250; a phase lock loop (PLL) feedback divider 255; a phase detector 260; a loop filter 265; a multiplexer/switch 270; an amplifier or buffer 275; and a controller or processor 280.

In some embodiments, oscillator 205 comprises a stable fixed frequency reference such as a crystal oscillator or a surface acoustic wave (SAW) oscillator. Oscillator 205 may be selected to have a low frequency drift and low phase noise characteristics.

In some embodiments, DDS 230 may have a similar configuration to DDS 100 shown in FIG. 1.

In some embodiments, tunable oscillator 250 may be a voltage controlled oscillator (VCO) or an yttrium-iron-garnet (YIG) tuned oscillator (YTO).

In operation, oscillator 205 outputs an output signal at an oscillator frequency $F_{LO}$, which is provided to first and second programmable frequency dividers 210 and 215, respectively. First programmable frequency divider 210 divides the frequency $F_{LO}$ by a first frequency divider value J and outputs a first reference signal 211 having a first reference frequency $F_{LO}/J$, and second programmable frequency divider 215 divides the oscillator frequency $F_{LO}$ by a second frequency divider value K and outputs a second reference signal 213 having a second reference frequency $F_{LO}/K$.

In some embodiments, the first and second frequency divider values J and K are programmable and are selected by controller 280.

Mixer 220 receives the first and second reference signals 211 and 213 and outputs a signal 221. Signal 221 has a first frequency F1, which is the sum of the first and second reference frequencies, and has a second frequency F2, which is the difference between the first and second reference frequencies. In that case, F1 is given by:

$$F1=(F_{LO}/J+F_{LO}/K), \qquad (4)$$

and F2 is given by:

$$F2=|F_{LO}/J-F_{LO}/K|. \qquad (5)$$

Filter arrangement 225 receives signal 221 and outputs a sampling clock signal having a sampling clock frequency $F_{CLK}$. Filter arrangement 225 rejects one of first and second frequencies F1 and F2, and passes the other of first and second frequencies F1 and F2 as sampling clock frequency $F_{CLK}$.

In some embodiments, filter arrangement 225 has a selectable pass band under the control of a control signal from controller 280. For example, in some embodiments filter arrangement 225 may comprise an arrangement of two different filters having two different pass bands, with the filters' respective inputs and outputs connected to multiplexers or switches that are controlled by controller 280 to choose which of the filters is selected. In that way, for example, filter arrangement 225 may be controlled in some circumstances to pass the first frequency F1, which is the sum of the first and second reference frequencies, and in other circumstances to pass the second frequency F2, which is the difference between the first and second reference frequencies.

Quantitatively, according to an illustrative embodiment, controller 280 controls first and second programmable frequency dividers 210 and 215 and filter arrangement 225 to output a sampling clock signal having a sampling clock frequency $F_{CLK}$ that is given by either:

$$F_{CLK} = F_{LO} * \left( \frac{1}{J} + \frac{1}{K} \right) \qquad (6a)$$

or $$F_{CLK} = F_{LO} * \left( \left| \frac{1}{J} - \frac{1}{K} \right| \right), \qquad (6b)$$

depending on whether filter arrangement 225 passes the first frequency F1 (equation 6a), or passes the second frequency F2 (equation 6b).

In some embodiments, controller 280 selects the first and second frequency divider values J and K, and/or whether filter arrangement 225 passes F1 (equation 6a) or passes F2 (equation 6b), so as to eliminate crossing spurs in the frequency spectrum of the output of DDS 230.

DDS 230 receives from filter arrangement 225 the sampling clock signal having the sampling clock frequency $F_{CLK}$, and also receives a programmable value N as a frequency control word from controller 280, and in response thereto outputs a DDS output signal 231 having a DDS output frequency $F_O$ that is a function of the sampling clock frequency $F_{CLK}$ and the frequency control word N. By changing N and/or $F_{CLK}$, controller 280 may select or vary the DDS output frequency $F_O$. In particular, the DDS output frequency $F_O$ is given by:

$$F_O = \frac{N}{2^S} F_{CLK}, \qquad (7)$$

where N is the value of a frequency control word provided to DDS 230 from controller 280, and S is the number of bits in the phase accumulator of DDS 230.

In many applications, an output frequency is required that is much higher than that which can be practically output directly from DDS 230 because of technology limitations governing the operating clock rates of circuitry included in DDS 230 (e.g., the output digital-to-analog converter). Accordingly, frequency generator 200 includes a frequency multiplier branch and a phase lock loop (PLL) branch, the outputs of which are multiplexed by multiplexer/switch 270 for outputting a signal with a frequency $M*F_O$ that is coherent with, and substantially greater than, DDS output frequency $F_O$. The frequency multiplier branch, which includes amplifier or buffer 235, frequency multiplier 240, and filter arrangement 245, provides lower phase noise and faster tuning than the PLL branch. The PLL branch, which includes tunable oscillator 250, PLL feedback divider 255, phase detector 260, and loop filter 265, provides lower spurious output levels than the frequency multiplier branch.

In applications where tuning speed is not important, the frequency multiplier branch and multiplexer/switch 270 may be omitted. In other applications where spurious performance is not critical, the PLL branch and multiplexer/switch 270 may be omitted. In frequency generation applications where DDS output frequency $F_O$ is adequate, the frequency multiplier branch, the PLL branch, and multiplexer/switch 270 all may be omitted. So in this sense frequency generator 200 represents a generalized example embodiment.

Frequency multiplier 240 (e.g., a multiplying diode, doubler, or tripler, etc.) multiplies DDS output frequency $F_O$ by a modulus M to produce a signal with an output frequency $M*F_O$. Filter arrangement 245 filters the output of frequency multiplier 240 to select a component at the desired frequency $M*F_O$ and to reject other undesired components, for example at other undesired harmonic multiples of $F_O$. In some embodiments, filter arrangement 245 includes a switched filter arrangement wherein a pass band of filter arrangement 245 can be varied and selected in response to a control signal from controller 280.

In the PLL branch, tunable oscillator 250 is phase locked to DDS output signal 231 through PLL feedback divider 255 having a modulus M so as to also effectively multiply DDS output frequency $F_O$ by modulus M.

Spurs and phase noise in DDS output signal 231 are multiplied by modulus M with either branch. However with the PLL branch, the spurs can be eliminated by the loop filter 265 if the spur frequency is outside of the loop bandwidth of the PLL branch. With the frequency multiplier branch, the multiplied spurs cannot be eliminated entirely due to the much wider bandwidth of the filter arrangement 245, but only can be pushed away to minimize their impact.

In some embodiments, the DDS output frequency $F_O$ may be varied or tuned over a wide frequency range in response to different programmable values of frequency control word N provided by controller 280. For example, in some embodiments DDS output frequency $F_O$ may be varied over several octaves or orders of magnitude (e.g., from nearly DC to 900 MHz).

As noted above, whenever DDS output frequency $F_O$ is close to an integer sub-multiple of the sampling clock frequency $F_{CLK}$, a low-frequency beat note is produced to cause spurs to be generated. Each spur frequency $F_{SPUR}$ is the difference between a harmonic H of the output frequency $F_O$ and a harmonic P of the sampling clock frequency $F_{CLK}$, i.e., $F_{SPUR}=H*F_O \pm P*F_{CLK}$, where H and P are integer values. A crossing spur occurs when a spur frequency $F_{SPUR}$ moves across zero.

In a beneficial feature, frequency generator 200 includes the ability to change the sampling clock frequency $F_{CLK}$ so as to avoid crossing spurs for any particular DDS output frequency $F_O$. In particular, given the oscillator frequency $F_{LO}$, the spur frequency $F_{SPUR}$ in the spectrum of the DDS output signal 231 is:

$$F_{SPUR} = \left(H*\frac{N}{2^S} \pm P\right)*F_{LO}*\left(\frac{1}{J}+\frac{1}{K}\right) \quad (8a)$$

or $$F_{SPUR} = \left(H*\frac{N}{2^S} \pm P\right)*F_{LO}*\left(\left|\frac{1}{J}-\frac{1}{K}\right|\right), \quad (8b)$$

depending on whether filter arrangement 225 passes the first frequency F1, which is the sum the frequencies of the first and second reference frequencies (equation 8a), or passes the second frequency F2, which is the difference between the first and second reference frequencies (equation 8b).

In some embodiments, whenever the DDS output frequency $F_O$ is close to a crossing spur, the first frequency divider value J and/or the second frequency divider value K can be varied or changed, for example by controller 280, to shift the spur frequency $F_{SPUR}$ away from the desired DDS output frequency $F_O$. More specifically, in some embodiments, for any desired DDS output frequency $F_O$, controller 280 can select first and second frequency divider values J and K (and thereby $F_{CLK}$) and frequency control word N so as to eliminate any consequential crossing spurs in the frequency spectrum of the DDS output signal 231. This can provide contiguous (while not necessarily continuous) coverage of the DDS output frequency $F_O$ over a wide frequency range, which is required for certain applications such as the first local oscillator (LO) frequency of a sweeping spectrum analyzer, while still maintaining acceptable spurious output levels.

Figure 3:
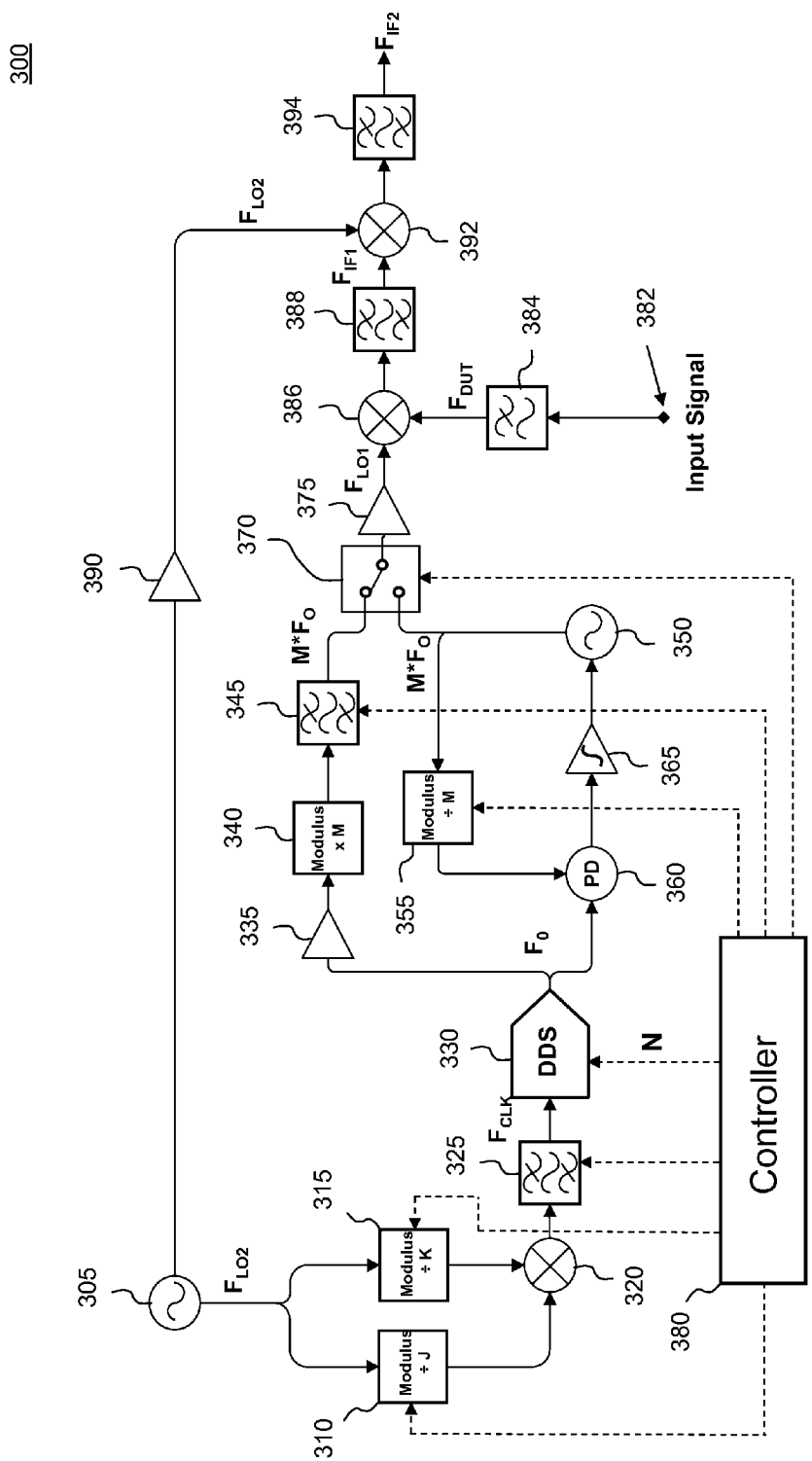
FIG. 3 illustrates one embodiment of a signal processor that includes a programmable or variable frequency generator.

FIG. 3 illustrates one embodiment of a signal processor 300. Signal processor 300 includes: an oscillator 305; a first programmable divider 310; a second programmable divider 315; a mixer 320; a filter arrangement 325; a direct digital synthesizer (DDS) 330; an amplifier or buffer 335; a frequency multiplier 340; a filter arrangement 345; a tunable oscillator 350; a phase lock loop (PLL) feedback divider 355; a phase detector 360; a loop filter 365; a multiplexer/switch 370; amplifier or buffer 375; a controller or processor 380; an input port 382; an input filter 384; a first intermediate frequency (IF) mixer 386; a first IF filter 388, a second local oscillator (LO) amplifier or buffer 390; a second IF mixer 392; and a second IF filter 394.

Oscillator 305, first programmable divider 310, second programmable divider 315, mixer 320, filter arrangement 325, direct digital synthesizer (DDS) 330, amplifier or buffer 335, frequency multiplier 340, filter arrangement 345, tunable oscillator 350, phase lock loop (PLL) feedback divider 355, phase detector 360, loop filter 365, switch 370, amplifier or buffer 375, and controller/processor 380 may have the same characteristics as the corresponding elements of the frequency generator 200 of FIG. 2, and so a detailed description of these elements and their operation will not be repeated except to note additional features or characteristics of significance in the context of signal processor 300.

In one example embodiment, signal processor 300 comprises a dual conversion receiver of a spectrum analyzer (SA) that frequency translates an input signal of a device under test (DUT), received at input port 382, to a second IF frequency in the pass band of second IF filter 394.

In that case, the frequency-multiplied output signal of DDS 330 at the output of amplifier/buffer 375 is a $1^{st}$ local oscillator (LO) signal having a $1^{st}$ LO frequency $F_{LO1}=M*F_O$. First IF mixer 386 mixes the input signal from the DUT with the $1^{st}$ LO signal to generate a first IF signal.

In a beneficial feature, in signal processor 300 the same oscillator 305 that is used in conjunction with first and second programmable dividers 310 and 315 to generate the sampling clock signal for DDS 330 at the sampling clock frequency $F_{CLK}$ is also employed for the $2^{nd}$ LO signal for signal processor 300.

The output phase noise of DDS 330 consists of phase noise of the sampling clock signal scaled by the output frequency and residual noise of the signal chain. The output noise is given as:

$$(\Delta\phi_o)^2 = \left(\frac{M}{2^N} \cdot \Delta\phi_s\right)^2 + (\Delta\phi_R)^2, \qquad (9)$$

where $\phi_S$ is the phase noise (root-mean-square spectral noise density in radians/$\sqrt{Hz}$) of the sampling clock signal, and $\phi_R$ is the residual phase noise of the signal chain.

Meanwhile, the phase noise of signal processor 300, $\phi_{SA}$, is given as:

$$(\Delta\phi_{SA})^2 = (\Delta\phi_{LO1})^2 + (\Delta\phi_{LO2})^2 + (\Delta\phi_{DUT})^2, \qquad (10)$$

where $\phi_{LO1}$ is the phase noise of the $1^{st}$ LO signal, $\phi_{LO2}$ is the phase noise of the $2^{nd}$ LO signal (i.e., the phase noise of oscillator 305), and $\phi_{DUT}$ is the phase noise of the input signal from the DUT.

The $1^{st}$ LO frequency $F_{LO1}$ is given as:

$$F_{LO1} = F_{LO2} \cdot \left(\frac{1}{J} + \frac{1}{K}\right) \cdot \frac{N}{2^S} \cdot M \qquad (11)$$

Since the $1^{st}$ LO signal is derived from the $2^{nd}$ LO signal, the close-in portion of phase noise that is coherent for the two LO signals is subtracted at second IF mixer 392. The detected phase noise of signal processor 300, $\phi_{SA}$, can therefore be expressed in terms of the phase noise of the input signal from the DUT and the phase noise of oscillator 305 and becomes:

$$(\Delta\phi_{SA})^2 = \left(\Delta\phi_{LO2} \cdot \frac{F_{DUT} + F_{IF2}}{F_{LO2}}\right)^2 + (\Delta\phi_{DUT})^2, \qquad (12)$$

where $F_{DUT}$ is the input frequency of signal processor 300 at input port 382 and $F_{IF2}$ is the output frequency of second IF mixer 392.

As an illustrative example, in a case where $F_{LO2}$ is 1200 MHz, $F_{IF2}$ is 80 MHz, and the input frequency range of the DUT is from 0 to 900 MHz, then the ratio $$\frac{F_{DUT} + F_{IF2}}{F_{LO2}}$$

has a range of 0.067 to 0.817, depending on the actual input frequency $F_{DUT}$. The coherent noise at zero input frequency is reduced by 20*log(0.067)=23 dB from the phase noise of the $2^{nd}$ LO (i.e., oscillator 305). At the highest input frequency, there is still 1.7 dB of noise reduction from the $2^{nd}$ LO. Compared to a design without cancellation, the phase noise improvement would be much greater. For example, with a typical wideband tunable $1^{st}$ LO having 10 dB higher phase noise than a fixed $2^{nd}$ LO, then the phase noise improvement from the cancellation scheme would be from about 33 to 11.7 dB. Cancellation of coherent noise from the $2^{nd}$ LO allows a low-cost $2^{nd}$ LO with inferior phase noise to achieve superior system phase noise performance. When a low-noise $2^{nd}$ LO is used, improvement due to coherent noise cancellation is reduced or even masked by the residual phase noise of the system signal chain. In this case all system components should be designed for low-noise to take advantage of coherent noise cancellation.

While example embodiments are disclosed herein, one of ordinary skill in the art appreciates that many variations that are in accordance with the present teachings are possible and remain within the scope of the appended claims. The invention therefore is not to be restricted except within the scope of the appended claims.

The invention claimed is:

1. A device, comprising:
   an input port configured to receive an input signal;
   a programmable first frequency generator including a direct digital synthesizer (DDS) configured to receive a sampling clock signal having a variable sampling clock frequency and in response thereto to generate a first local oscillator (LO) signal having a variable first LO frequency;
   a first intermediate frequency (IF) mixer configured to mix the input signal and the first LO signal to produce a first IF signal;
   a second local oscillator configured to generate a second LO signal having a second LO frequency;
   a second intermediate frequency (IF) mixer configured to mix the first IF signal and the second LO signal to produce a second IF signal, wherein the sampling clock signal is synchronously derived from the second LO signal;
   a first programmable frequency divider configured to receive the second LO signal and to divide the second LO frequency by a first programmable frequency divider value to produce a first reference signal having a first reference frequency;
   a second programmable frequency divider configured to receive the second LO signal and to divide the second LO frequency by a second programmable frequency divider value to produce a second reference signal having a second reference frequency; and
   a reference frequency mixer configured to mix the first and second reference signals, and to output the sampling clock signal.

2. The device of claim 1, further comprising a selectable filter at an output of the reference frequency mixer, the selectable filter being controlled by the controller to select as the sampling clock frequency one of: (1) a sum of the first and second reference frequencies; and (2) a difference between the first and second reference frequencies.

3. The device of claim 1, wherein the programmable first frequency generator further comprises a frequency multiplier configured to receive an output signal of the DDS having a DDS output frequency and in response thereto to output a frequency multiplier output signal having the first LO frequency as an integer multiple of the DDS output frequency, where the integer is greater than one.

4. The device of claim 3, wherein the programmable first frequency generator further comprises a filter arrangement having a selectable passband for filtering the frequency multiplier output signal.

5. The device of claim 4, wherein the programmable first frequency generator further comprises:
   a phase lock loop (PLL) including a tunable oscillator phase locked to an output of the DDS and outputting a PLL output signal having the first LO frequency; and
   a switch configured to select one of the filtered multiplier output signal and the PLL output signal as the first LO signal.

6. The device of claim 1, wherein the programmable first frequency generator further comprises a phase lock loop (PLL) including a tunable oscillator phase locked to an output of the DDS and outputting a PLL output signal having the first LO frequency as an integer multiple of the DDS output frequency.

7. The device of claim 1, further comprising:
a first IF bandpass filter having a first passband centered at a first IF frequency and being configured to filter the first IF signal; and
a second IF bandpass filter having a second passband centered at a second IF frequency and being configured to filter the second IF signal,
wherein the first LO frequency is selected in combination with the second LO frequency to translate the input signal to the second IF frequency.

8. A device, comprising:
an input port configured to receive an input signal;
a programmable first frequency generator configured to generate a first local oscillator (LO) signal having a variable first LO frequency;
a first intermediate frequency (IF) mixer configured to mix the input signal and the first LO signal to produce a first IF signal;
a second local oscillator configured to generate a second LO signal having a second LO frequency; and
a second intermediate frequency mixer configured to mix the first IF signal and the second LO signal to produce a second IF signal,
wherein the programmable first frequency generator comprises:
a first programmable frequency divider configured to receive the second LO signal and to divide the second LO frequency by a first programmable frequency divider value to produce a first reference signal having a first reference frequency,
a second programmable frequency divider configured to receive the second LO signal and to divide the second LO frequency by a second programmable frequency divider value to produce a second reference signal having a second reference frequency,
a reference frequency mixer configured to mix the first and second reference signals, and to output a sampling clock signal having a sampling clock frequency,
a direct digital synthesizer (DDS) configured to receive the sampling clock signal and a programmable frequency control word, and in response thereto to output a DDS output signal having a DDS output frequency that is a function of the sampling clock frequency and the programmable frequency control word, and
a signal processor adapted to receive the DDS output signal and to multiply the DDS output frequency to generate the first LO signal.

9. The device of claim 8, wherein the signal processor includes a frequency multiplier configured to receive the DDS output signal and in response thereto to output a frequency multiplier output signal having the first LO frequency as an integer multiple of the DDS output frequency, where the integer is greater than one.

10. The device of claim 9, wherein the signal processor further comprises a filter arrangement having a selectable passband for filtering the frequency multiplier output signal.

11. The device of claim 10, wherein the signal processor further comprises:
a phase lock loop (PLL) including a tunable oscillator phase locked to the DDS output signal and outputting a PLL output signal having the first LO frequency; and
a switch configured to select one of the filtered frequency multiplier output signal and the PLL output signal as the first LO signal.

12. The device of claim 8, wherein the signal processor further comprises a phase lock loop (PLL) including a tunable oscillator phase locked to the DDS output signal and outputting PLL output signal having the first LO frequency as an integer multiple of the DDS output frequency.

13. The device of claim 8, further comprising:
a first IF bandpass having a passband centered at a first IF frequency and being configured to filter the first IF signal; and
a second IF bandpass filter having a passband centered at a second IF frequency and being configured to filter the second IF signal,
wherein the first LO frequency is selected in combination with the second LO frequency to translate the input signal to the second IF frequency.

14. The device of claim 8, further comprising a controller configured to select the first programmable frequency divider value, the second programmable frequency divider value, and the programmable frequency control word in combination such that crossing spurs are avoided in a frequency spectrum of the DDS output signal as the DDS output frequency is varied over an operating frequency range.

15. The device of claim 14, further comprising a selectable filter at an output of the mixer, the selectable filter being controlled by the controller to select as the sampling clock frequency one of: (1) a sum of the first and second reference frequencies; and (2) a difference between the first and second reference frequencies.

* * * * *

UNITED STATES PATENT AND TRADEMARK OFFICE
CERTIFICATE OF CORRECTION

| | | |
|---|---|---|
| PATENT NO. | : 8,699,985 B1 | Page 1 of 1 |
| APPLICATION NO. | : 12/770622 | |
| DATED | : April 15, 2014 | |
| INVENTOR(S) | : Wing J. Mar | |

It is certified that error appears in the above-identified patent and that said Letters Patent is hereby corrected as shown below:

On the Title Page, under "Other Publications", in column 2, line 1, Delete "Synthises:" and insert -- Synthesis: --, therefor.

In the Claims

In column 12, line 25, In Claim 12, before "PLL" insert -- a --.

In column 12, line 28, In Claim 13, before "having" insert -- filter --.

Signed and Sealed this
Twenty-ninth Day of July, 2014

Michelle K. Lee
*Deputy Director of the United States Patent and Trademark Office*